United States Patent
Kakishita

(10) Patent No.: US 11,766,742 B2
(45) Date of Patent: Sep. 26, 2023

(54) LASER PROCESSING APPARATUS

(71) Applicant: Prime Planet Energy & Solutions, Inc., Tokyo (JP)

(72) Inventor: Kenichi Kakishita, Okazaki (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 92 days.

(21) Appl. No.: 17/540,061

(22) Filed: Dec. 1, 2021

(65) Prior Publication Data

US 2022/0168843 A1    Jun. 2, 2022

(51) Int. Cl.
| | |
|---|---|
| *B23K 26/16* | (2006.01) |
| *B23K 37/04* | (2006.01) |
| *B23K 26/08* | (2014.01) |

(52) U.S. Cl.
CPC .......... *B23K 26/16* (2013.01); *B23K 26/0823* (2013.01); *B23K 37/0408* (2013.01)

(58) Field of Classification Search
CPC . B23K 37/0408; B23K 26/0823; B23K 26/16
USPC .................................................. 219/121.82
See application file for complete search history.

(56) References Cited

U.S. PATENT DOCUMENTS

2012/0241419 A1* 9/2012 Rumsby ............... B23K 26/355
                                                                219/121.6

FOREIGN PATENT DOCUMENTS

| | | | |
|---|---|---|---|
| JP | 2007185685 | A | 7/2007 |
| JP | 2008100232 | A | 5/2008 |
| JP | 201527779 | A | 2/2015 |
| JP | 201531669 | A | 2/2015 |
| JP | 2015031669 | A * | 2/2015 |
| JP | 5729739 | B1 | 6/2015 |
| JP | 2015188905 | A | 11/2015 |
| JP | 2016423 | A | 1/2016 |
| JP | 2016100194 | A | 5/2016 |
| JP | 2016139495 | A | 8/2016 |
| KR | 20130014799 | A * | 2/2013 |
| KR | 102075274 | B1 * | 2/2020 |

* cited by examiner

Primary Examiner — Jimmy Chou
(74) Attorney, Agent, or Firm — HAUPTMAN HAM, LLP

(57) ABSTRACT

A laser processing apparatus includes a feeding mechanism including at least one feeding roller and winds the electrode sheet around an outer circumferential surface of the feeding roller to feed the electrode sheet in a feeding direction. When an imaginary contact plane surface contacted with a first surface of the electrode sheet on the laser processing points generated on the electrode sheet by a laser irradiation mechanism is determined as a boundary, a region on a side where the electrode sheet is contacted with the imaginary contact plane surface is defined as a first region and a region on an opposite side is defined as a second region. A peripheral edge of an opening portion of the dust collection hood is placed in the first region with respect to the imaginary contact plane surface.

10 Claims, 8 Drawing Sheets

LASER PROCESSING APPARATUS

CROSS-REFERENCE TO RELATED APPLICATIONS

This application is based upon and claims the benefit of priority from the prior Japanese Patent Application No. 2020-200294 filed on Dec. 2, 2020, the entire contents of which are incorporated herein by reference.

BACKGROUND

Technical Field

The present disclosure relates to a laser processing apparatus.

Related Art

Heretofore, as one example of a laser processing apparatus, there is known a laser processing apparatus including a laser irradiation mechanism to apply laser processing to an object to be processed (a target object) by irradiating laser beam to a first surface of the target object and a dust collection mechanism provided with a dust collection hood covering laser processing points of the target object from a first-surface side of the target object to collect dust by discharging (sucking) the air contained in a region which is surrounded by the dust collection hood and the target object. This type of laser processing apparatus is, for example, disclosed in Japan Patent No. 5729739.

SUMMARY

Technical Problems

However, in the laser processing apparatus of the Japan Patent No. 5729739, there is a clearance formed between a peripheral edge of an opening portion of the dust collection hood (an opening portion opening to the laser processing points) and the first surface of the target object. In this type of the laser processing apparatus, when scattering materials such as spatters scattering or flying linearly to the first-surface side from the laser processing points of the target object at a low angle, the scattering materials could scatter outside the dust collection hood through the clearance between the peripheral edge of the opening portion of the dust collection hood and the first surface of the target object, so that the dust collection mechanism sometimes fails to collect dust. Herein, as an object to be processed, an electrode sheet is known, for example, and as a laser irradiation mechanism, for example, there is known a laser irradiation mechanism configured to emit laser beam to a first surface of an electrode sheet which is being fed in a feeding direction by a feeding mechanism and to apply laser processing to the electrode sheet.

The present disclosure has been made in view of the above circumstances and has a purpose of providing a laser processing apparatus achieving reduction in the amount of scattering materials (materials such as spatters scattering from laser processing points of an electrode sheet) that has been leaked out of a dust collection hood and has failed to be collected by a dust collection mechanism.

Means of Solving the Problems

One embodiment of the present disclosure is a laser processing apparatus comprising: a feeding mechanism to feed an electrode sheet to be applied with laser processing in a feeding direction; a laser irradiation mechanism to apply laser processing to the electrode sheet by irradiating laser beam to a first surface of the electrode sheet which is fed by the feeding mechanism; and a dust collection mechanism including a dust collection hood covering laser processing points of the electrode sheet from a first-surface side of the electrode sheet to collect dust by discharging the air contained in a region surrounded by the dust collection hood and the electrode sheet, wherein the feeding mechanism includes at least one feeding roller configured such that the electrode sheet is wound around an outer circumferential surface of the feeding roller to feed the electrode sheet in the feeding direction, at least one imaginary contact plane surface, which is in contact with a first surface of the electrode sheet at the respective laser processing points generated on the electrode sheet by the laser irradiation mechanism, is determined as a boundary, and a region on a side where the electrode sheet is contacted with the imaginary contact plane surface is defined as a first region and a region on an opposite side is defined as a second region, and a peripheral edge of an opening portion of the dust collection hood is positioned in the first region with respect to the imaginary contact plane surface.

The above-mentioned laser processing apparatus includes the laser irradiation mechanism to apply laser processing to the electrode sheet by irradiating the laser beam to the first surface (with respect to the first surface) of the electrode sheet that is being fed by the feeding mechanism. Further, the laser processing apparatus includes the dust collection mechanism including the dust collection hood covering the laser processing points of the electrode sheet from the first-surface side of the electrode sheet. This dust collection mechanism is to collect dust by discharging (sucking) the air contained in the region surrounded by the dust collection hood and the electrode sheet.

Incidentally, scattering materials such as spatters scattering linearly on the first-surface side (a side opposite to the second-surface side) from the laser processing points of the electrode sheet are to scatter in the second region with respect to the imaginary contact plane surface of the respective laser processing points (the imaginary plane surface where the laser processing points are in contact with the first surface of the electrode sheet) even when the scattering materials scatter from the laser processing points at the lowest angle. The electrode sheet includes the first surface and the second surface on the opposite side of the first surface. Further, with the imaginary contact plane surface as a boundary, the region on a side where the electrode sheet is contacted with the imaginary contact plane surface is defined as the first region and the region on its opposite side is defined as the second region.

On the other hand, in the above-mentioned laser processing apparatus, the peripheral edge of the opening portion of the dust collection hood (the opening portion opening on a side of the laser processing points) is positioned in the first region with respect to the imaginary contact plane surface. In other words, a wall portion of the dust collection hood extends to the first region from an inside of the second region with respect to the imaginary contact plane surface. To be more specific, an inner space of the dust collection hood reaches not only the second region but also the first region.

Accordingly, any one of the scattering materials scattering linearly from the laser processing points of the electrode sheet to the first-surface side can hit on an inner surface of the dust collection hood, and thus it is possible to prevent leakage of the scattering materials leaking outside the dust collection hood and to prevent failure in dust collection. Therefore, according to the above-mentioned laser processing apparatus, it is possible to achieve reduction in the amount of the scattering materials (materials such as spatters scattering from the laser processing points of the electrode sheet) that leak outside the dust collection hood (scatter outside) and fail to be collected by the dust collection mechanism.

Further, the above-mentioned laser processing apparatus includes the feeding mechanism including at least one feeding roller to wind the electrode sheet around the outer circumferential surface of the feeding roller and to feed the electrode sheet in the feeding direction. Providing this feeding mechanism achieves easy arrangement of the peripheral edge of the opening portion (the opening portion opening on a side of the laser processing points) of the dust collection hood inside the first region with respect to the imaginary contact plane surface.

Further, in the above-mentioned laser processing apparatus, preferably, the feeding mechanism includes the one feeding roller to feed the electrode sheet by winding a second surface on an opposite side of the first surface of the electrode sheet, and the laser irradiation mechanism is configured to apply laser processing to a portion of the electrode sheet located on an outer circumferential surface of the one feeding roller.

In the above-mentioned laser processing apparatus, the feeding mechanism includes the one feeding roller around which the electrode sheet is wound such that the second surface opposite to the first surface of the electrode sheet is in contact with the outer circumferential surface of the feeding roller so that the electrode sheet is fed in a circumferential direction of the feeding roller. Further, the laser irradiation mechanism applies laser processing to the portion of the electrode sheet located on the outer circumferential surface of the one feeding roller. Specifically, while the electrode sheet is being fed along the outer circumferential surface of the feeding roller, the laser irradiation mechanism applies laser processing to a predetermined portion (a portion to be irradiated) of the electrode sheet located on the outer circumferential surface of the feeding roller by irradiating the laser beam.

In this type of apparatus, for example, a shape of the electrode sheet in a position (area) where the laser processing points are generated is of an arcuate circular shape along the outer circumferential surface of the feeding roller. For this reason, the shape of the dust collection hood may be formed, for example, to cover at least a part of the feeding roller so that the laser processing points generated on the electrode sheet are housed in an inside space of the dust collection hood. By this configuration, the peripheral edge of the opening portion of the dust collection hood can be placed inside the first region with respect to the imaginary contact plane surface.

Alternatively, in the laser processing apparatus is, preferably, the feeding mechanism is configured to: include a first feeding roller and a second feeding roller, and wind the second surface opposite to the first surface of the electrode sheet around the outer circumferential surface of the first feeding roller and feed the electrode sheet in a circumferential direction of the first feeding roller, and then feed the electrode sheet to the second feeding roller from the first feeding roller, and after that, wind the second surface of the electrode sheet around an outer circumferential surface of the second feeding roller and feed the electrode sheet to a circumferential direction of the second feeding roller, and the laser irradiation mechanism applies laser processing to a portion of the electrode sheet fed from the first feeding roller to the second feeding roller.

In the above-mentioned laser processing apparatus, the feeding mechanism includes the first feeding roller and the second feeding roller. This feeding mechanism is configured such that the second surface on the opposite side of the first surface of the electrode sheet is wound around the outer circumferential surface of the first feeding roller and the electrode sheet is fed in the circumferential direction of the first feeding roller, and then, the electrode sheet is fed to the second feeding roller from the first feeding roller, and after that, the second surface of the electrode sheet is wound around the outer circumferential surface of the second feeding roller so that the electrode sheet is fed in the circumferential direction of the second feeding roller. Then, the laser irradiation mechanism applies laser processing to a portion to be fed to the second feeding roller from the first feeding roller of the electrode sheet. To be specific, while the electrode sheet is positioned between the first feeding roller and the second feeding roller, the laser irradiation mechanism applies laser processing by emitting the laser beam to the predetermined portion (the irradiation target portion) of the portion (to be called as a roller intermediate portion) of the electrode sheet positioned between the first feeding roller and the second feeding roller.

In the laser processing apparatus with this configuration, a shape of the dust collection hood may be, for example, configured to accommodate the first surface included in the roller intermediate portion of the electrode sheet in the inside space of the dust collection hood. This configuration achieves placement of the peripheral edge of the opening portion of the dust collection hood inside the first region with respect to the imaginary contact plane surface.

DETAILED DESCRIPTION OF THE EXEMPLARY EMBODIMENTS

First Embodiment

Figure 1:
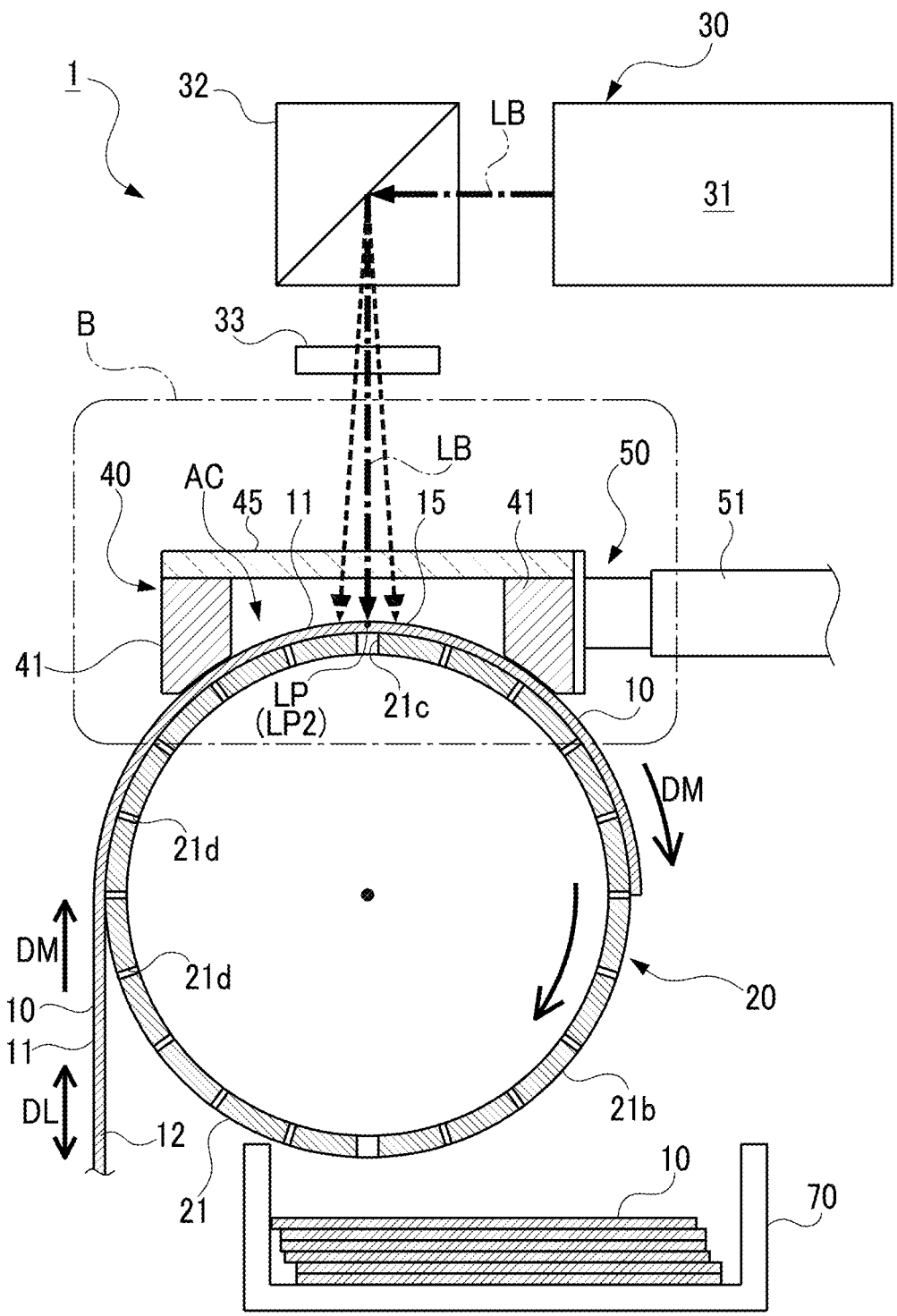
FIG. 1 is a schematic view of a laser processing apparatus in a first embodiment.

A first embodiment embodying the present disclosure will be explained in detail below with reference to the accompanying drawings. A laser processing apparatus 1 of the first embodiment is an apparatus for applying laser processing to an electrode sheet 10 as shown in FIG. 1. Specifically, the laser processing apparatus 1 is provided with, as shown in FIG. 1, a feeding mechanism 20, a laser irradiation mechanism 30, and a dust collection mechanism 50. Further, in the first embodiment, laser processing is performed in a manner that the electrode sheet 10 of a strip-like shape extending in a longitudinal direction DL is irradiated with laser beam LB linearly from one end to the other end in a width direction (a direction orthogonal to the longitudinal direction DL or a direction orthogonal to a paper surface of FIG. 1) of the electrode sheet 10, so that the electrode sheet 10 is applied with cutting in the width direction to form a plurality of rectangular electrode sheets 10. The electrode sheet 10 is, for example, utilized as a positive electrode or a negative electrode of a lithium-ion secondary battery.

The feeding mechanism 20 is to convey or feed the electrode sheet 10 as an object to be applied with laser processing in a feeding direction DM. This feeding direction DM is a direction along the longitudinal direction DL of the electrode sheet 10 prior to application of laser processing. The feeding mechanism 20 of the first embodiment includes a single feeding roller 21 to be wound around with a second surface 12 on an opposite side of a first surface 11 of the electrode sheet 10 to feed the electrode sheet 10. To be specific, the feeding roller 21 feeds the electrode sheet 10 in the feeding direction DM (a circumferential direction of the feeding roller 21) such that the second surface 12 of the electrode sheet 10 is made to be in contact with an outer circumferential surface 21b of the feeding roller 21 to wind the electrode sheet 10 around the feeding roller 21 (see FIG. 1).

Herein, the feeding roller 21 is a suction roller of a hollow-cylindrical shape and is formed with numerous through holes 21d on a cylindrical-shaped wall portion constituting the outer circumferential surface 21b (see FIG. 1). To this feeding roller 21, a suction device (not shown) to suck the air in an inner space of the feeding roller 21 is connected. Suction of the air in the feeding roller 21 by this suction device applies the force of sucking the electrode sheet 10 that has been wound around the outer circumferential surface 21b of the feeding roller 21 toward a center of the feeding roller 21 via the through holes 21d of the feeding roller 21. Thus, the electrode sheet 10 wound around the outer circumferential surface 21b of the feeding roller 21 is being fed along the outer circumferential surface 21b of the feeding roller 21 while being sucked to the outer circumferential surface 21b of the feeding roller 21. Further, the feeding roller 21 is provided with a linear through hole 21c of a linear shape extending in an axial direction of the feeding roller 21 to pass through the wall portion constituting the outer circumferential surface 21b.

The laser irradiation mechanism 30 is provided with a fiber-laser oscillator 31, a galvanometer mirror 32, and a fθ lens 33 (see FIG. 1). This laser irradiation mechanism 30 applies laser processing to the electrode sheet 10 by irradiating the laser beam LB directed to the first surface 11 (with respect to the first surface 11) of the electrode sheet 10 which is being fed by the feeding mechanism 20. Specifically, the laser irradiation mechanism 30 applies laser processing to a portion 15 of the electrode sheet 10 placed on the outer circumferential surface 21b of the feeding roller 21. In other words, while the electrode sheet 10 is being fed along the outer circumferential surface 21b of the feeding roller 21, the laser irradiation mechanism 30 applies laser processing by emitting the laser beam LB to a predetermined portion (an irradiation target portion 15b) of the electrode sheet 10 located on the outer circumferential surface 21b of the feeding roller 21.

In the first embodiment, the laser irradiation mechanism 30 applies laser processing to cut the electrode sheet 10 in the width direction by serially emitting the laser beam LB from one end to the other end in the width direction with respect to the irradiation target portion 15b that linearly extends from one end to the other end in the width direction (the direction orthogonal to the longitudinal direction DL or the direction orthogonal to a paper surface of FIG. 1) of the electrode sheet 10 of a strip-like shape extending in the longitudinal direction DL. Thus, a plurality of rectangular electrode sheets 10 are formed from the strip-shaped electrode sheet 10. The thus formed rectangular electrode sheets 10 are accommodated in a housing case 70 placed below the feeding roller 21. Herein, the irradiation target portion 15b moves along the outer circumferential surface 21b of the feeding roller 21 in association with rotation of the feeding roller 21 in the circumferential direction. Accordingly, in association with movement of the irradiation target portion 15b, an angle of the galvanometer mirror 32 is changed so that the entire irradiation target portion 15b is irradiated with the laser beam LB.

The dust collection mechanism 50 is provided with a dust collection hood 40 and a dust collection hose 51 connecting the dust collection hood 40 and the suction device (not shown). The dust collection hood 40 includes a ceiling portion 45 made of laser-beam transmitting glass and an annular side-wall portion 41 extending downward from an outer peripheral edge of the ceiling portion 45. The dust collection hood 40 covers laser processing points LP of the electrode sheet 10 from the first-surface 11 side of the electrode sheet 10. The laser processing points LP of the present embodiment are generated over the entire irradiation target portion 15b of the electrode sheet 10 and generated continuously widthwise from one end to the other end in the width direction of the electrode sheet 10. This dust collection mechanism 50 is to collect scattering materials such as spatters scattering from the laser processing points LP of the electrode sheet 10 by sucking and discharging the air contained in a region AC surrounded by the dust collection hood 40 and the electrode sheet 10 by use of the not-shown suction device through the dust collection hose 51.

Figure 2:
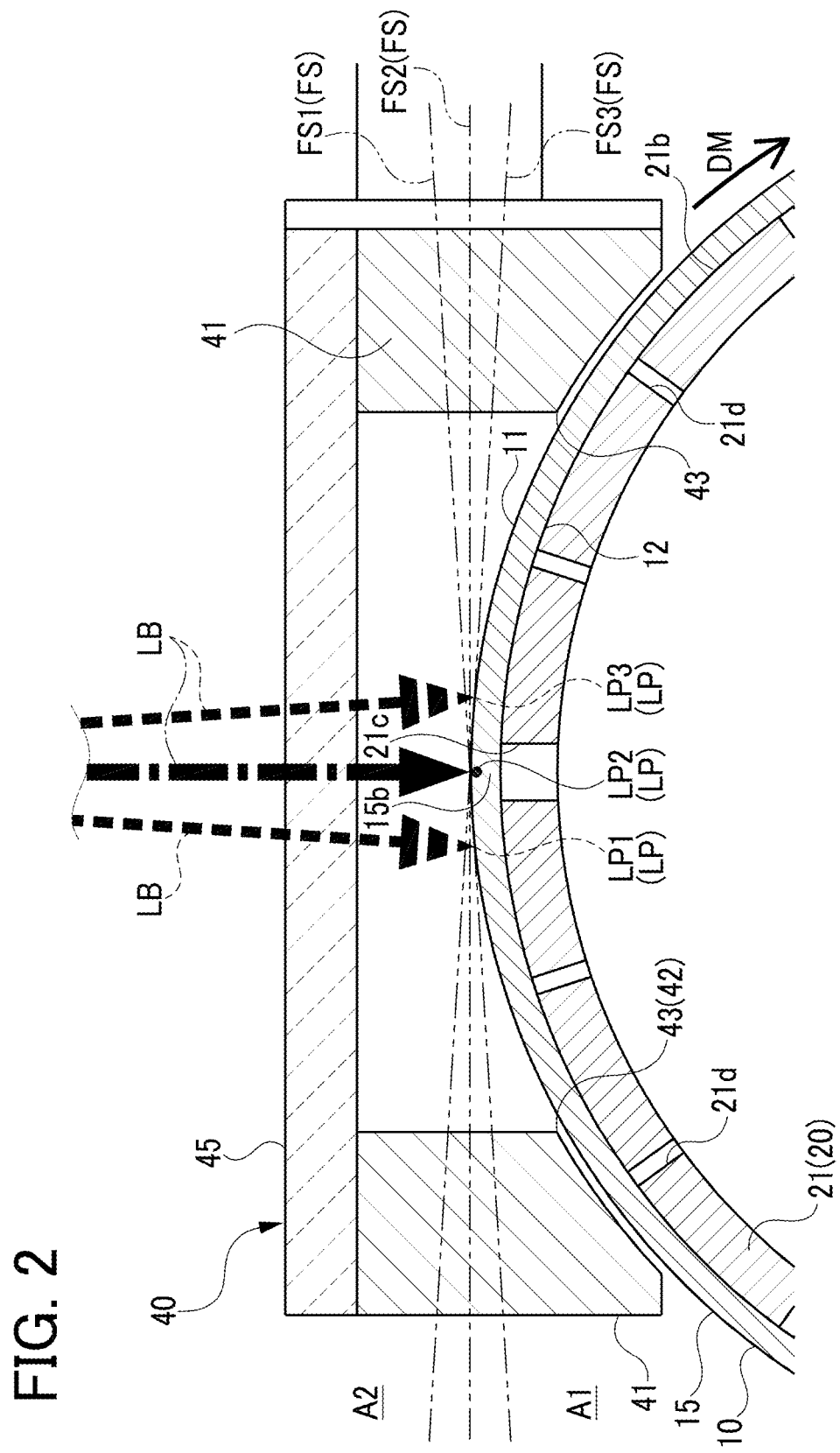
FIG. 2 is an enlarged view of a part B in FIG. 1.

Incidentally, even when the scattering materials such as spatters scatter linearly to the first-surface 11 side (an opposite side of the second surface 12) from the laser processing points LP of the electrode sheet 10 at the lowest angle from the laser processing points LP, the scattering materials are to scatter inside a second region A2 with respect to each of the imaginary contact plane surfaces FS on the respective laser processing points LP. The imaginary contact plane surfaces FS represent imaginary plane surfaces contacted with the first surface 11 of the electrode sheet 10 on the respective laser processing points LP as shown in FIG. 2. Further, as for the respective imaginary contact plane surfaces FS, the imaginary contact plane surface serves as a boundary for defining a region on a side (a lower side in FIG. 2) where the electrode sheet 10 is contacted with the imaginary contact plane surface FS as a first region A1 and defining a region on an opposite side (an upper side in FIG. 2) as a second region A2 (see FIG. 2).

On the other hand, in the laser processing apparatus 1 of the present first embodiment, a peripheral edge 43 (an annular peripheral edge) of an opening portion 42 (an opening portion that opens to a side of the laser processing points LP, or an opening that opens downward in FIG. 2) of the dust collection hood 40 is positioned in the first region A1 with respect to the respective imaginary contact plane surfaces FS. To be specific, the side wall portion 41 of the dust collection hood 40 extends from inside of the second region A2 to inside of the first region A1 with respect to the respective imaginary contact plane surfaces FS. In other words, an inner space (a space surrounded by the ceiling portion 45 and the side wall portion 41) of the dust collection hood 40 reaches not only the inside of the second region A2 but also the inside of the first region A1 (see FIG. 2).

Herein, a laser processing point LP1 is the laser processing point LP generated on one end in the width direction of the electrode sheet 10, and a laser processing point LP3 is the laser processing point LP generated on the other end in the width direction of the electrode sheet 10. A laser processing point LP2 is the laser processing point LP generated on a center in the width direction of the electrode sheet 10. Further, an imaginary contact plane surface FS1 is an imaginary plane surface contacted with the first surface 11 of the electrode sheet 10 on the laser processing point LP1, an imaginary contact plane surface FS2 is an imaginary surface contacted with the first surface 11 of the electrode sheet 10 on the laser processing point LP2, and an imaginary contact plane surface FS3 is an imaginary plane surface contacted with the first surface 11 of the electrode sheet 10 on the laser processing point LP3 (see FIG. 2). Accordingly, when the peripheral edge 43 of the opening portion 42 of the dust collection hood 40 is positioned in the first region A1 with respect to both of the imaginary contact plane surface FS1 and the imaginary contact plane surface FS3, the peripheral edge 43 of the opening portion 42 of the dust collection hood 40 is deemed to be placed inside the first region A1 with respect to all the imaginary contact plane surfaces FS.

Herein, FIG. 1 and FIG. 2 are figures illustrating a case of forming the laser processing point LP2, and in FIG. 1 and FIG. 2, the electrode sheet 10 is shown with its cross-section taken along the laser processing point LP2. Further, in FIG. 1 and FIG. 2, among four wall portions constituting the annular side wall portion 41 of the dust collection hood 40, only two wall portions extending along an axial line of the feeding roller 21 are illustrated in their cross-section, but other two wall portions (not shown) which connect the illustrated two wall portions also extend through the second region A2 to the first region A1 with respect to the respective imaginary contact plane surfaces FS.

Accordingly, any scattering materials scattering linearly to the first-surface 11 side from the laser processing points LP of the electrode sheet 10 can hit on an inner surface of the dust collection hood 40, thus achieving prevention of the scattering materials from leaking outside the dust collection hood 40 and prevention of collection failure. Therefore, according to the laser processing apparatus 1 of the present embodiment, it is possible to reduce the amount of the scattering materials (materials such as spatters scattering from the laser processing points LP of the electrode sheet 10) that leak out (flies outside) of the dust collection hood 40 and fails to be collected by the dust collection mechanism 50.

Further, in the present embodiment 1, the irradiation target portion 15b (the portion where the leaser processing points LP are generated) of the electrode sheet 10 is configured to be arranged in a position radially outside the feeding roller 21 with respect to the linear through hole 21c of the feeding roller 21 (see FIG. 2). Therefore, the scattering materials scattering to the second-surface 12 side from the laser processing points LP of the electrode sheet 10 enter in the feeding roller 21 through the linear through hole 21c. By sucking the air in the inside space of the feeding roller 21, the scattering materials having entered the feeding roller 21 can be collected.

The laser processing apparatus 1 of the present embodiment includes the feeding mechanism 20 including the feeding roller 21 to feed the electrode sheet 10 by winding the electrode sheet 10 around the outer circumferential surface 21b of the feeding roller 21 as a feeding mechanism. This configuration of the feeding mechanism 20 achieves easy arrangement of the peripheral edge 43 of the opening portion 42 of the dust collection hood 40 in the first region A1 with respect to the respective imaginary contact plane surfaces FS.

To be specific, in the laser processing apparatus 1 of the present embodiment, in positions (area) of the electrode sheet 10 where the laser processing points LP are generated, the shape of the electrode sheet 10 is formed to be an arcuate shape along the outer circumferential surface 21b of the feeding roller 21 (see FIG. 2). Accordingly, the shape of the dust collection hood 40 can be formed to cover at least a part (an upper part) of the feeding roller 21 so that all the laser processing points LP are housed in the inside space of the dust collection hood 40. This configuration achieves arrangement of the peripheral edge 43 of the opening portion 42 of the dust collection 40 inside the first region A1 with respect to the respective imaginary contact plane surfaces FS.

Second Embodiment

Figure 3:
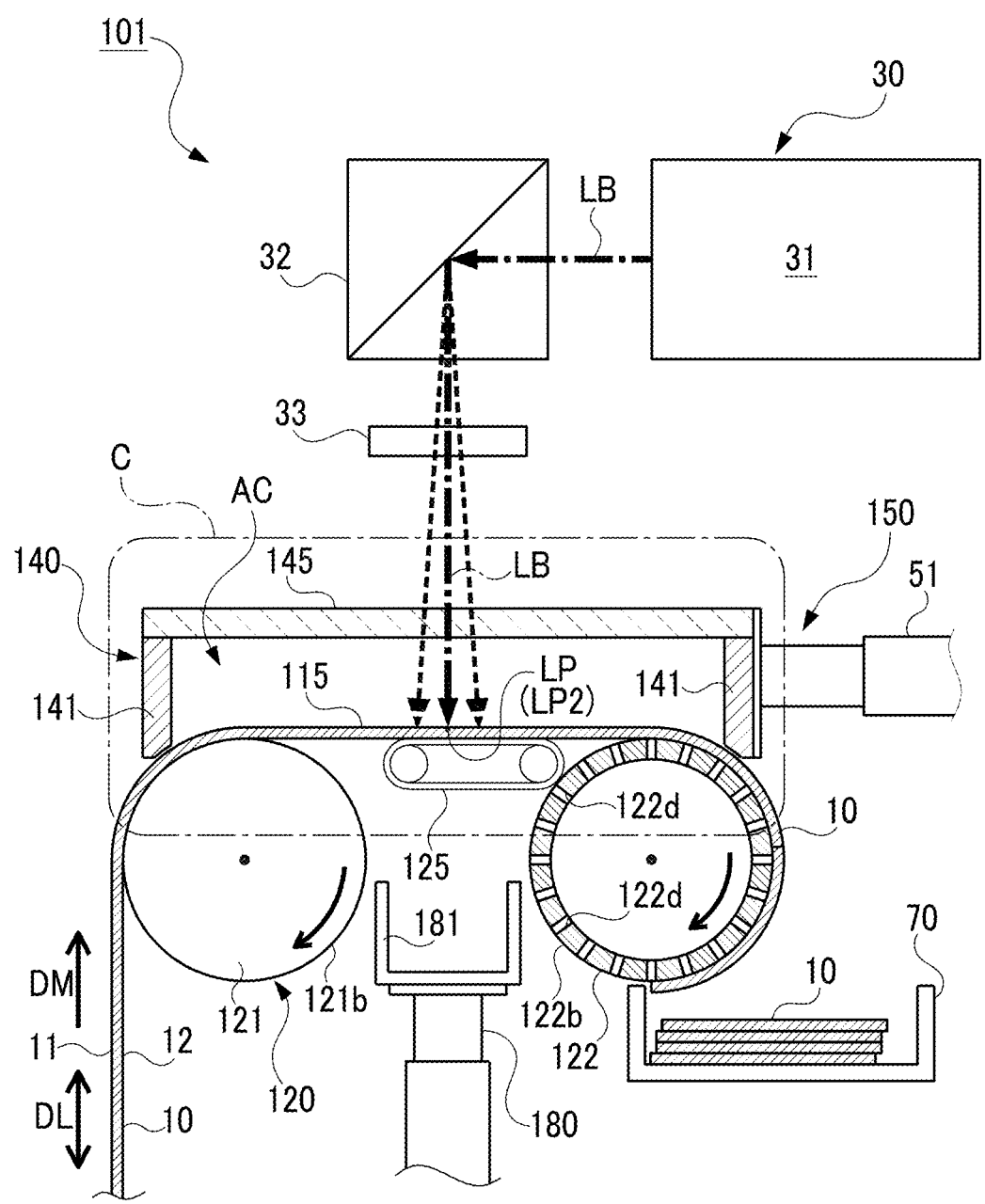
FIG. 3 is a schematic view of the laser processing apparatus in a second embodiment.

A laser processing apparatus 101 according to a second embodiment is now explained. The following explanation is made with focus on the differences from the laser processing apparatus 1 of the first embodiment, and explanation for similar features is omitted or made simply. In the second embodiment, too, as similar to the first embodiment, the electrode sheet 10 is applied with laser processing to cut the sheet in the width direction to fabricate a plurality of the rectangular electrode sheets 10. As shown in FIG. 3, the laser processing apparatus 101 is provided with a feeding mechanism 120 which is different from that of the first embodiment, the laser irradiation mechanism 30 similar to that of the first embodiment, and a dust collection mechanism 150 different from that of the first embodiment.

The feeding mechanism 120 includes two feeding rollers (a first feeding roller 121 and a second feeding roller 122) and a suction belt 125 to feed the electrode sheet 10 in the feeding direction DM. The first feeding roller 121 is a feeding roller of a columnar shape. The second feeding roller 122 is a suction roller of a hollow cylindrical shape and is provided with multiple through holes 122d on a cylindrical wall portion constituting an outer circumferential surface 122b (see FIG. 3).

This feeding mechanism 120 is configured to bring the second surface 12 of the electrode sheet 10 into contact with an outer circumferential surface 121b of the first feeding roller 121 to wind the electrode sheet 10 around the outer circumferential surface 121b of the first feeding roller 121 and feed the electrode sheet 10 in a circumferential direction of the first feeding roller 121. Then, the electrode sheet 10 is fed from the first feeding roller 121 to the second feeding roller 122. Subsequently, while the electrode sheet 10 is wound around the outer circumferential surface 122b of the second feeding roller 122 in a manner that the second surface 12 of the electrode sheet 10 is in contact with the outer circumferential surface 122b of the second feeding roller 122, the electrode sheet 10 is fed in the circumferential direction of the second feeding roller 122. Herein, the suction belt 125 sucks a portion adjacent to an upstream side and a portion adjacent to a downstream side in the feeding direction DM of the electrode sheet 10 with respect to cutting positions which are applied with laser processing and feeds the electrode sheet 10 including the thus sucked portions of the electrode sheet 10 to the second feeding roller 122.

The laser irradiation mechanism 30 applies laser processing to a portion (an inter-roller portion 115) of the electrode sheet 10 that is being fed from the first feeding roller 121 to the second feeding roller 122 to cut the electrode sheet 10 in the width direction. Specifically, when the electrode sheet 10 is positioned between the first feeding roller 121 and the second feeding roller 122, the laser irradiation mechanism 30 emits the laser beam LB to a predetermined portion (an irradiation target portion 115b) of the inter-roller portion 115 positioned between the first feeding roller 121 and the second feeding roller 122 of the electrode sheet 10 to apply laser processing of cutting the electrode sheet 10 in the width direction. Herein, the irradiation target portion 115b (see FIG. 4) is similar to the irradiation target portion 15b of the first embodiment.

The dust collection mechanism 150 is provided with a dust collection hood 140 and the dust collection hose 51 connecting the dust collection hood 140 and a suction device (not shown) (see FIG. 3). The dust collection hood 140 includes a ceiling portion 145 made of laser-beam transmitting glass and an annular side wall portion 141 extending downward from an outer peripheral edge of the ceiling portion 145. The dust collection hood 140 covers each of the laser processing points LP of the electrode sheet 10 from the first-surface 11 side of the electrode sheet 10. This dust collection mechanism 150 is to collect scattering materials such as spatters scattering from the respective laser processing points LP of the electrode sheet 10 by sucking and discharging the air contained in the region AC surrounded by the dust collection hood 140 and the electrode sheet 10 by the not-shown suction device through the dust collection hose 51.

In the present second embodiment 2, too, as similar to the first embodiment, the peripheral edge 143 (a peripheral edge of an annular shape) of the opening portion 142 of the dust collection hood 140 is positioned in the first region A1 with respect to the respective imaginary contact plane surfaces FS. To be more specific, the side wall portion 141 of the dust collection hood 140 extends from an inside of the second region A2 to an inside of the first region A1 with respect to the respective imaginary contact plane surfaces FS. Namely, an inner space (a space surrounded by the ceiling portion 145 and the side wall portion 141) of the dust collection hood 140 reaches not only the second region A2 but also the first region A1 (see FIG. 4).

Figure 4:
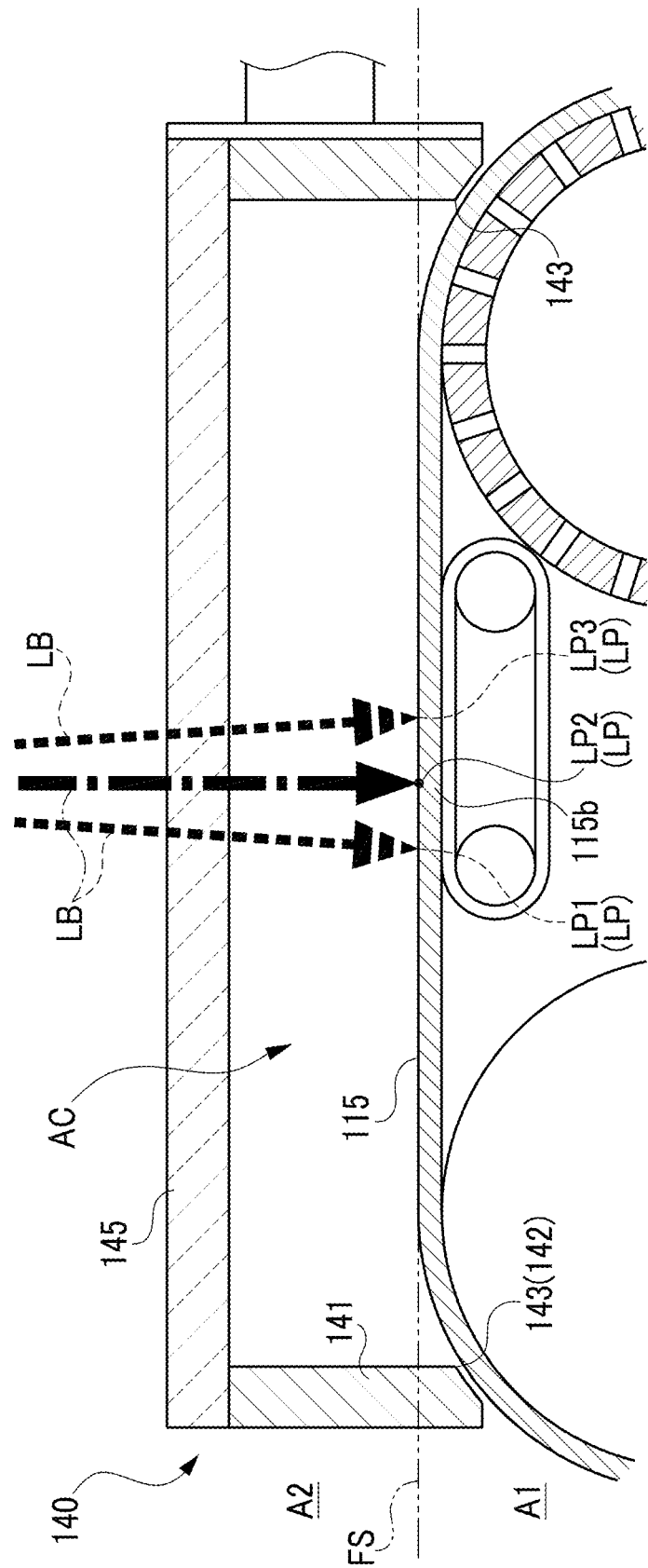
FIG. 4 is an enlarged view of a part C in FIG. 3.

Herein, FIG. 3 and FIG. 4 illustrate a state when the laser processing point LP2 is generated, and FIG. 3 and FIG. 4 each show a sectional view of the electrode sheet 10 at the laser processing point LP2. Further, in FIG. 3 and FIG. 4, among four wall portions constituting the annular side wall portion 141 of the dust collection hood 140, only two wall portions are illustrated in their cross-section extending along axial lines of the first feeding roller 121 and the second feeding roller 122, but two other wall portions (not shown) connecting the illustrated two wall portions also extend from the second region A2 to the first region A1 with respect to the respective imaginary contact plane surfaces FS.

By this configuration, any scattering materials scattering linearly from the laser processing points LP of the electrode sheet 10 to the first-surface 11 side can hit on an inner surface of the dust collection hood 140, so that the scattering materials can be prevented from leaking out of the dust collection hood 140 and from failing to be collected. Therefore, according to the laser processing apparatus 101 of the present embodiment, it is possible to reduce the amount of the scattering materials (materials such as the spatters scattering from the laser processing points LP of the electrode sheet 10) that leak out of the dust collection hood 140 and fail to be collected by the dust collection mechanism 150.

In the present second embodiment, the respective imaginary contact plane surfaces FS of the laser processing points LP1 to LP3 are identical. Therefore, in the present second embodiment, on all the laser processing points LP, the imaginary contact plane surfaces are identical. The first region A1 is defined as a region on a side (a lower side in FIG. 4) where the electrode sheet 10 is contacted with the imaginary contact plane surfaces FS and the second region A2 is defined as a region on the opposite side (an upper side in FIG. 4).

Further, in the present second embodiment, a dust collection hood 181 of a dust collection mechanism 180 is arranged below the laser processing points LP generated on the electrode sheet 10 (between the first feeding roller 121 and the second feeding roller 122) (see FIG. 3). Accordingly, the scattering materials scattering from the laser processing points LP of the electrode sheet 10 to the side of the second surface 12 can be collected by the dust collection mechanism 180.

First Modified Embodiment

The first and second embodiments illustrate the laser processing apparatus 1, 101 each applying laser processing to cut the strip-shaped electrode sheet 10 in the width direction. Alternatively, there may be used a laser processing apparatus 201 of a first modified embodiment shown in FIG. 5 to irradiate the laser beam LB to an irradiation target portion 215b (a portion indicated with a double-dot chain line in FIG. 6) extending in the longitudinal direction DL on a non-laminated portion 216 as one end portion (a right-end portion in FIG. 6) in the width direction DW of a strip-shaped electrode sheet 210 to separate a part (a portion positioned on a right side of the irradiation target portion 215b in FIG. 6) of the non-laminated portion 216 of the strip-shaped electrode sheet 210. Herein, the electrode sheet 210 is formed of a laminated portion 218 laminated on a surface of a current-collecting foil 217 with an electrode mixture layer 219 and the non-laminated portion 216 in which the electrode mixture layer 219 is not laminated on the surface of the current collecting foil 217.

The laser processing apparatus 201 of the first modified embodiment is provided with a feeding mechanism 220 different from that of the first embodiment, a laser irradiation mechanism 230 different from that of the first embodiment, and the dust collection mechanism 50 similar to that of the first embodiment. The feeding mechanism 220 is different only in its feeding roller as compared with the feeding mechanism 20 of the first embodiment. Specifically, a feeding roller 221 of the first modified embodiment is, as compared with the feeding roller 21 of the first embodiment, different only in a configuration that the linear through hole 21c is changed to a linear through groove 221c. The linear through groove 221c is a groove portion of the same shape with the irradiation target portion 215b (see FIG. 6) of the electrode sheet 210 in planar view and is formed in a position facing to the irradiation target portion 215b along an entire circumference of the feeding roller 221. Further, on a bottom part of the linear through groove 221s, numerous through holes 221d are formed. The laser irradiation mechanism 230 is different from the laser irradiation mechanism 30 of the first embodiment only in a manner that the galvanometer mirror 232 is changed to change an irradiation position of the laser beam LB with respect to the electrode sheet 210.

Figure 5:
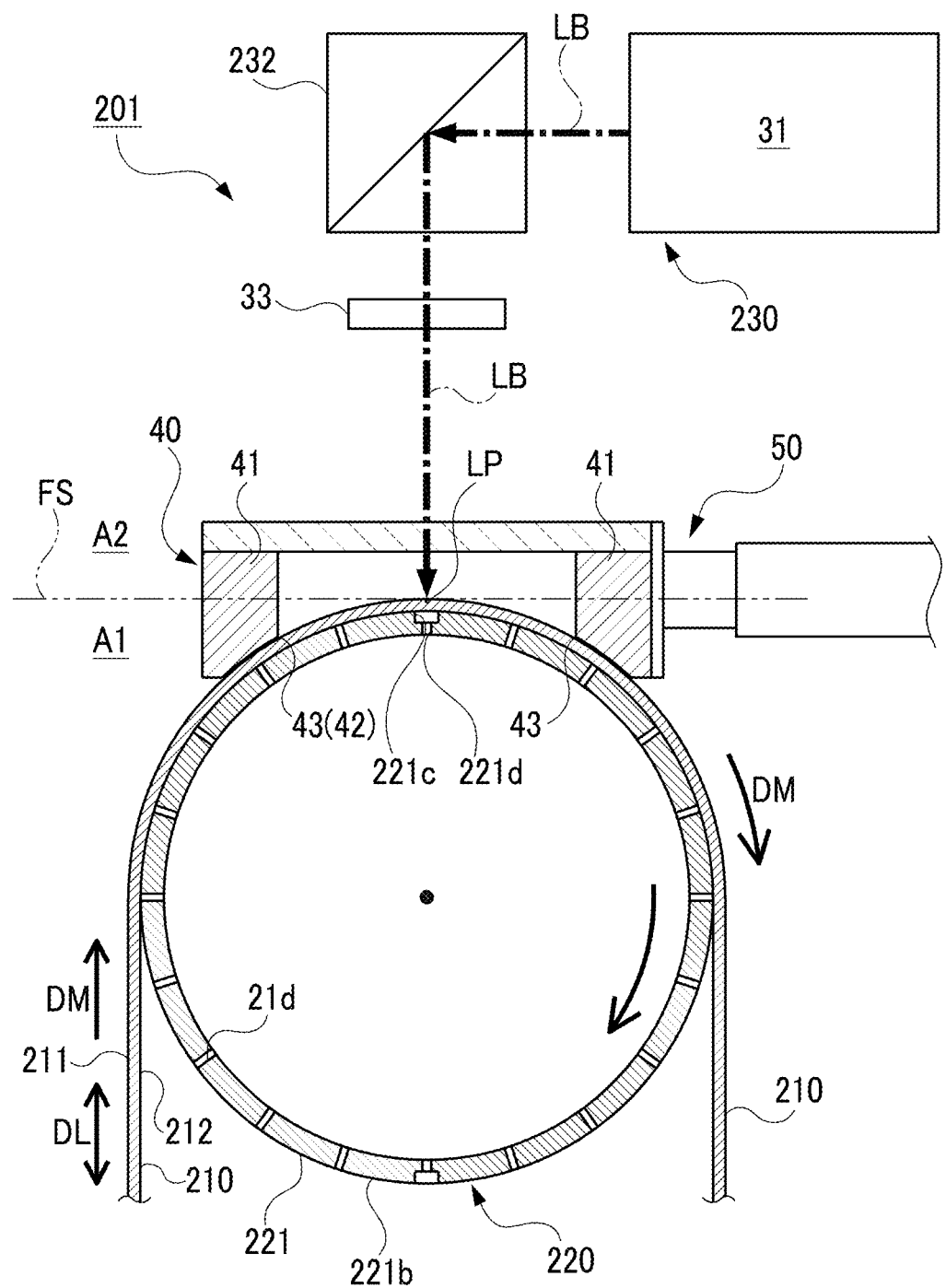
FIG. 5 is a schematic view of the laser processing apparatus in a first modified embodiment.
Figure 6:
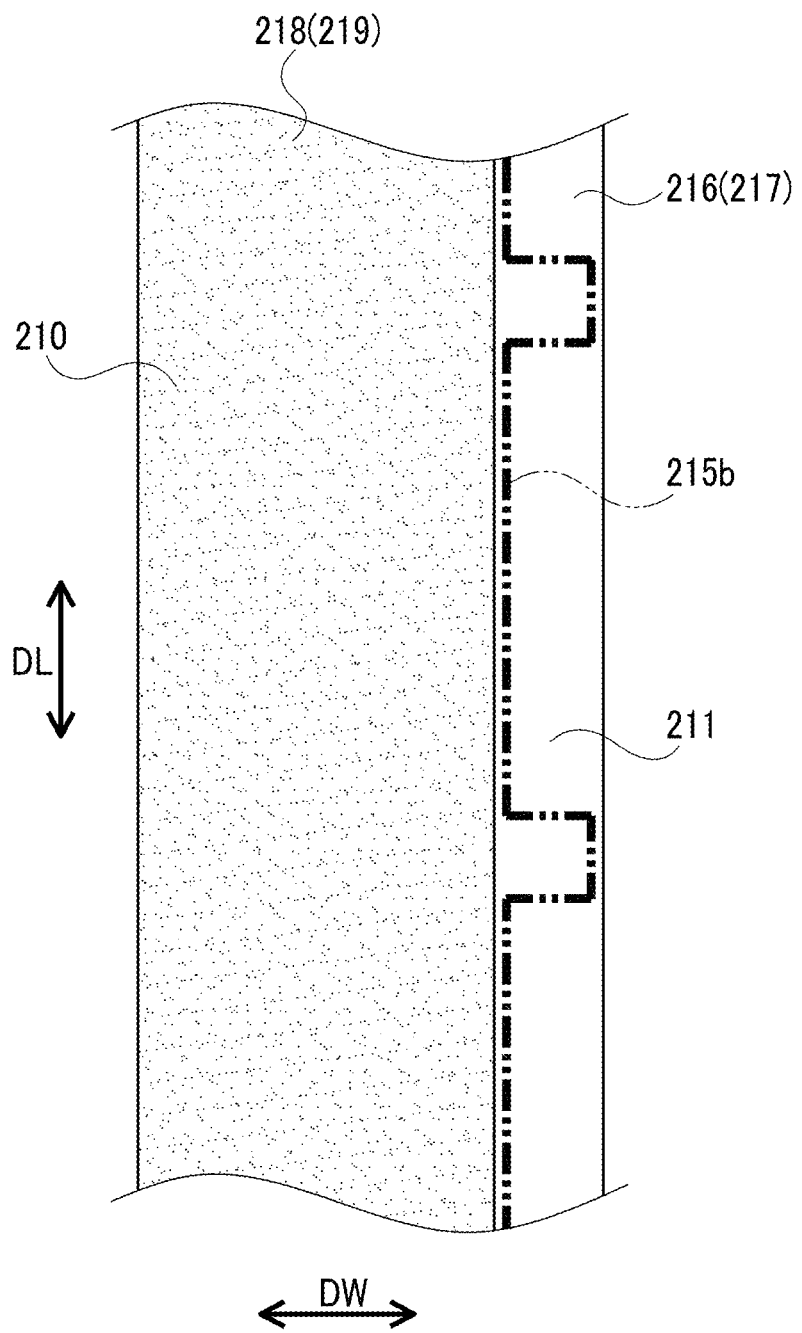
FIG. 6 is an explanatory view for explaining laser processing of an electrode sheet in the first modified embodiment.

In this first modified embodiment, as similar to the first embodiment, the peripheral edge 43 (the peripheral edge of annular shape) of the opening portion 42 of the dust collection hood 40 is positioned inside the first region A1 with respect to the imaginary contact plane surface FS (see FIG. 5). Thus, any scattering materials scattering linearly to the first-surface 211 side from the laser processing points LP of the electrode sheet 210 can hit on the inner surface of the dust collection hood 40, so that it is possible to prevent the scattering materials from leaking out of the dust collection hood 40 and from failing to be collected. Therefore, also in the laser processing apparatus 201 of the first modified embodiment, the amount of the scattering materials (materials such as spatters scattering from the laser processing points LP of the electrode sheet 210) that leak out of the dust collection hood 40 (scatters outside) and fail to be collected by the dust collection mechanism 50 can be reduced. In the first modified embodiment, the imaginary contact plane surface FS on all the laser processing points LP are identical.

Second Modified Embodiment

Figure 7:
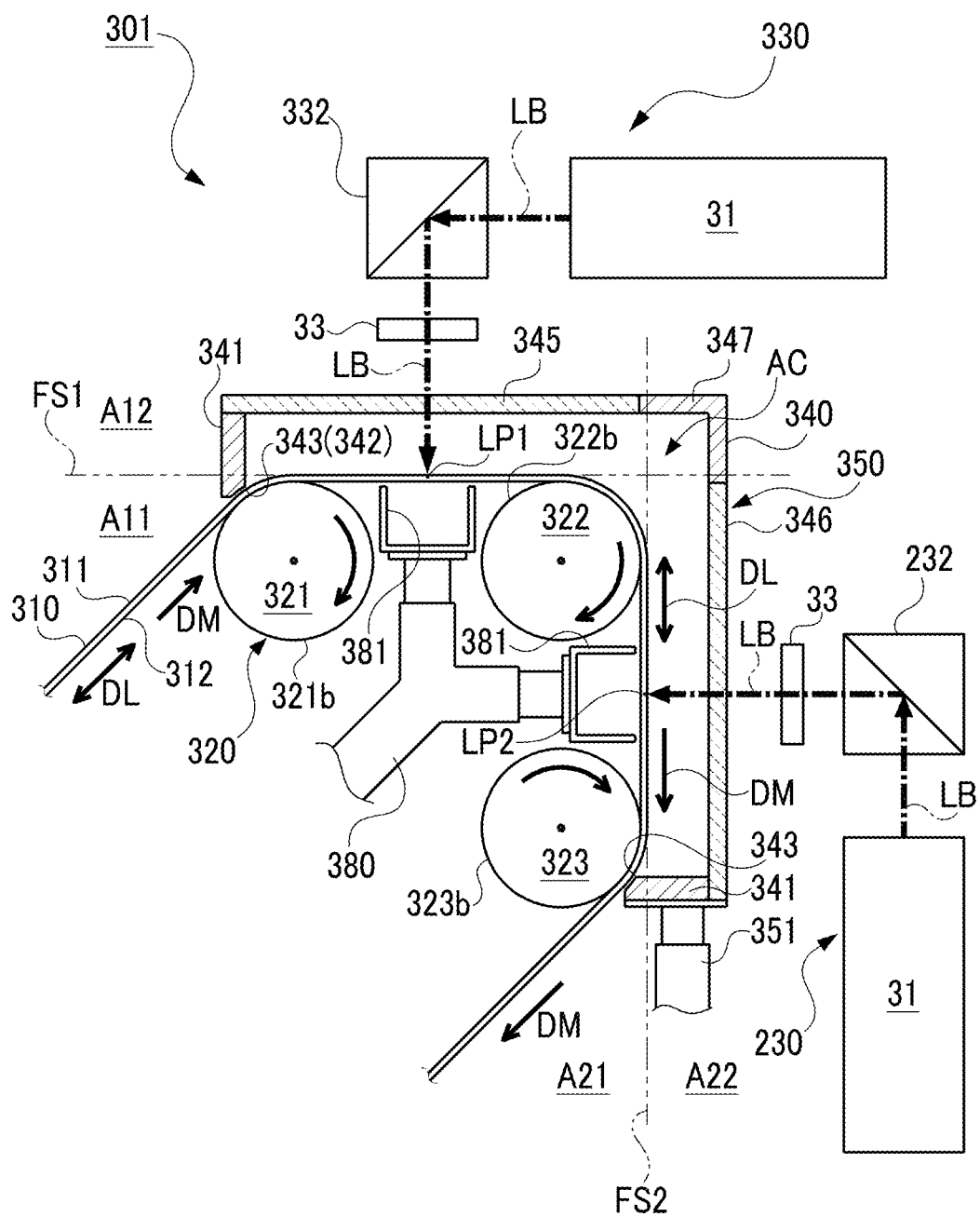
FIG. 7 is a schematic view of the laser processing apparatus in a second modified embodiment.

A laser processing apparatus 301 of a second modified embodiment is provided with a feeding mechanism 320 different from that of the first embodiment, a laser irradiation mechanism 330 different from that of the first embodiment, the laser irradiation mechanism 230 similar to that of the first modified embodiment, and a dust collection mechanism 350 different from that of the first embodiment (see FIG. 7). The feeding mechanism 320 includes a first feeding roller 321, a second feeding roller 322, and a third feeding roller 323, and these three rollers are arranged in this order from an upstream side of the feeding direction DM. An electrode sheet 310 has a second surface 312 that is brought into contact with an outer circumferential surface 321b of the first feeding roller 321, an outer circumferential surface 322b of the second feeding roller 322, and an outer circumferential surface 323b of the third feeding roller 323 so that the electrode sheet 310 is fed by the first feeding roller 321, the second feeding roller 322, and the third feeding roller 323 in the feeding direction DM.

Figure 8:
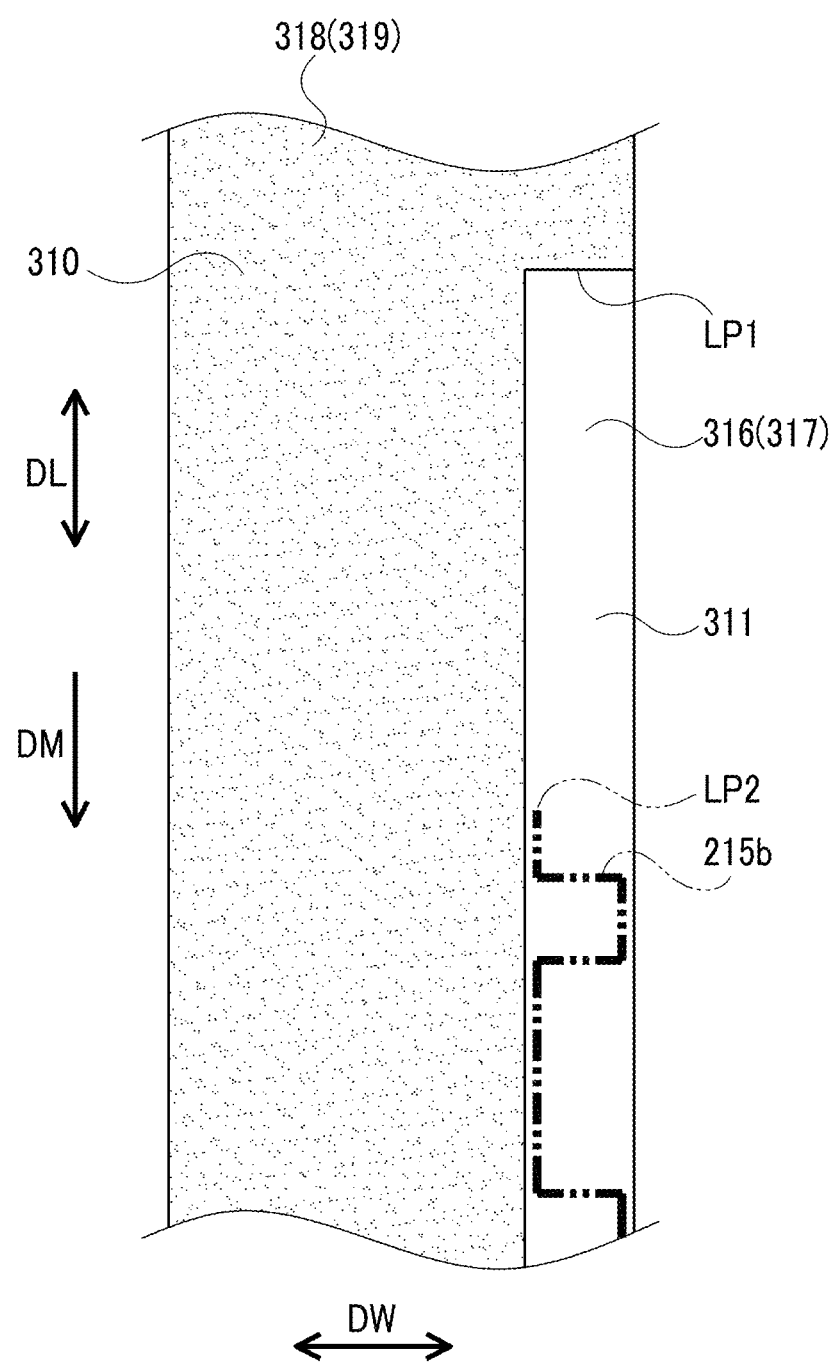
FIG. 8 is an explanatory view for explaining laser processing of the electrode sheet in the second modified embodiment.

The laser irradiation mechanism 330 is different from the laser irradiation mechanism 30 of the first embodiment by changing the galvanometer mirror 332 to change the irradiation point of the laser beam LB with respect to the electrode sheet 310 (see FIG. 7). The laser irradiation mechanism 330 applies laser processing to a portion (one end portion in the width direction of the electrode sheet 310) of the electrode sheet 310 that is being fed to the second feeding roller 322 from the first feeding roller 321 to remove one end portion in the width direction (a right-end portion in FIG. 8) of an electrode mixture layer 319 of the electrode sheet 310.

Herein, in the electrode sheet 310 prior to application of laser processing by the laser irradiation mechanism 330, the electrode mixture layer 319 has been laminated on an entire surface of a current collecting foil 317. By laser processing by the laser irradiation mechanism 330, the electrode sheet 310 is formed to be the electrode sheet 310 formed with a laminated portion 318 in which the surface of the current collecting foil 317 is laminated with the electrode mixture layer 319 and a non-laminated portion 316 in which the surface of the current collecting foil 317 is not laminated with the electrode mixture layer 319 (see FIG. 8). The laser irradiation mechanism 230 applies laser processing similar to the first modified embodiment to the portion of the electrode sheet 310 (the irradiation target portion 215b) that is being fed to the third feeding roller 323 from the second feeding roller 322.

A dust collection mechanism 350 is provided with a dust collection hood 340 and a dust collection hose 351 connecting the dust collection hood 340 and a suction device (not shown) (see FIG. 7). The dust collection hood 340 includes ceiling portions 345 and 346 which are made of laser-beam transmitting glass, a ceiling portion 347 connecting the ceiling portion 345 and the ceiling portion 346, and an annular side wall portion 341 extending from outer peripheral edges of the ceiling portions 345, 346, and 347 to sides where the first feeding roller 321, the second feeding roller 322, and the third feeding roller 323 are placed.

The dust collection hood 340 covers the respective laser processing points LP of the electrode sheet 310 from the first-surface 311 side of the electrode sheet 310 (see FIG. 7). Herein, the laser processing point LP made by the laser irradiation mechanism 330 is defined as a laser processing point LP1, and the laser processing point LP made by the laser irradiation mechanism 230 is defined as a laser processing point LP2. This dust collection mechanism 350 sucks the air in a region AC surrounded by the dust collection hood 340 and the electrode sheet 310 by a not-shown suction device through the dust collection hose 351 and discharges the air, and thus the scattering materials such as spatters scattering from the respective laser processing points LP1 and LP2 of the electrode sheet 310 can be collected.

In this second modified embodiment, too, a peripheral edge 343 (a peripheral edge of an annular shape) of an opening portion 342 of the dust collection hood 340 is positioned in the first region A11 with respect to the imaginary contact plane surface FS1 and positioned in the first region A21 with respect to the imaginary contact plane surface FS2 (see FIG. 7). Herein, the imaginary contact plane surface FS on the laser processing point LP1 is defined as an imaginary contact plane surface FS1 and the imaginary contact plane surface FS on the laser processing point LP2 is defined as an imaginary contact plane surface FS2. Further, the imaginary contact plane surface FS1 on all the laser processing points LP1 is identical, and the imaginary contact plane surface FS2 on all the laser processing points LP2 is identical. With the imaginary contact plane surface FS1 as a boundary, a region on a side (a lower side in FIG. 7) where the electrode sheet 310 is contacted with the imaginary contact plane surface FS1 is defined as the first region A11, and a region on the opposite side (an upper side in FIG. 7) is defined as the second region A12. Furthermore, with the imaginary contact plane surface FS2 as a boundary, a region on a side (a left side in FIG. 7) where the electrode sheet 310 is contacted with the imaginary contact plane surface FS2 is defined as the first region A21 and a region on the opposite side (a right side in FIG. 7) is defined as the second region A22.

Accordingly, in the laser processing apparatus 301 of the second modified embodiment, any scattering materials scattering linearly to the first-surface 311 side from the laser processing points LP1 and LP2 of the electrode sheet 310 can hit on an inner surface of the dust collection hood 340, and thus it is possible to prevent the scattering materials from leaking out of the dust collection hood 340 and from failing to be collected. Therefore, in the laser processing apparatus 301 of the second modified embodiment, too, the amount of the scattering materials (materials such as spatters scattering from the laser processing points LP1 and LP2 of the electrode sheet 310) that leak out of the dust collection hood 340 (scatter outside) and fail to be collected by the dust collection mechanism 350 can be reduced.

Further, in this second modified embodiment, a dust collection hood 381 of a dust collection mechanism 380 is placed below the laser processing point LP1 generated on the electrode sheet 310 (between the first feeding roller 321 and the second feeding roller 322) and on the left side of the laser processing point LP2 generated on the electrode sheet 310 (between the second feeding roller 322 and the third feeding roller 323) (see FIG. 7). Accordingly, the scattering materials scattering to the second-surface 312 side from the laser processing points LP1 and LP2 of the electrode sheet 310 can be collected by the dust collection mechanism 380.

As mentioned above, the present disclosure has been explained with the first and second embodiments and the first and second modified embodiments, but the present disclosure is not limited to the above-mentioned embodiments and may be embodied in other specific forms without departing from the essential characteristics thereof.

| Reference Signs List | |
|---|---|
| 1, 101, 201, 301 | Laser processing apparatus |
| 10, 210, 310 | Electrode sheet |
| 11, 211, 311 | First surface |
| 12, 212, 312 | Second surface |
| 20, 120, 220, 320 | Feeding mechanism |
| 21, 221 | Feeding roller |
| 21b, 121b, 122b, 221b, 321b, 322b, 323b | Outer circumferential surface |
| 30, 230, 330 | Laser irradiation mechanism |
| 40, 140, 340 | Dust collection hood |
| 42, 142, 342 | Opening portion |
| 43, 143, 343 | Peripheral edge |
| 50, 150, 350 | Dust collection mechanism |
| 121, 321 | First feeding roller |
| 122, 322 | Second feeding roller |
| 323 | Third feeding roller |
| A1, A11, A21 | First region |
| A2, A12, A22 | Second region |
| DM | Feeding direction |
| FS, FS1, FS2, FS3 | Imaginary contact plane surface |
| LB | Laser beam |
| LP, LP1, LP2, LP3 | Laser processing point |

What is claimed is:

1. A laser processing apparatus comprising:
   a feeding mechanism configured to feed an electrode sheet to be applied with laser processing in a feeding direction;
   a laser irradiation mechanism configured to apply laser processing to the electrode sheet by irradiating laser beam to a first surface of the electrode sheet which is fed by the feeding mechanism; and
   a dust collection mechanism including a dust collection hood covering laser processing points of the electrode sheet from a first-surface side of the electrode sheet to collect dust by discharging air contained in a region surrounded by the dust collection hood and the electrode sheet,
   wherein
   the feeding mechanism includes at least one feeding roller configured such that the electrode sheet is wound around an outer circumferential surface of the at least one feeding roller to feed the electrode sheet in the feeding direction,
   at least one imaginary contact plane surface, which is in contact with the first surface of the electrode sheet at the respective laser processing points generated on the electrode sheet by the laser irradiation mechanism, is determined as a boundary,
   a region on a side where the electrode sheet is contacted with the imaginary contact plane surface is defined as a first region and a region on an opposite side is defined as a second region,
   a peripheral edge of an opening portion of the dust collection hood has a curved shape as seen in a cross-sectional view of the dust collection hood, the cross-sectional view being taken in a laser beam direction along which the laser beam is irradiated to the first surface of the electrode sheet, and
   an entirety of the curved shape of the peripheral edge is positioned in the first region with respect to the imaginary contact plane surface.

2. The laser processing apparatus according to claim 1, wherein
   the at least one feeding roller is configured to feed the electrode sheet by winding a second surface of the electrode sheet, the second surface opposite to the first surface of the electrode sheet, and
   the laser irradiation mechanism is configured to apply laser processing to a portion of the electrode sheet located on the outer circumferential surface of the at least one feeding roller.

3. The laser processing apparatus according to claim 1, wherein
   the at least one feeding roller includes a first feeding roller and a second feeding roller,
   the first and second feeding rollers are configured to
      wind a second surface of the electrode sheet around an outer circumferential surface of the first feeding roller and feed the electrode sheet in a circumferential direction of the first feeding roller, the second surface opposite to the first surface, and then
      feed the electrode sheet to the second feeding roller from the first feeding roller, and after that,
      wind the second surface of the electrode sheet around an outer circumferential surface of the second feeding roller and feed the electrode sheet to a circumferential direction of the second feeding roller, and
   the laser irradiation mechanism is configured to apply the laser processing to a portion of the electrode sheet fed from the first feeding roller to the second feeding roller.

4. The laser processing apparatus according to claim 1, wherein
   the at least one feeding roller includes a first feeding roller and a second feeding roller, and
   the feeding mechanism further includes a suction belt between the first feeding roller and the second feeding roller in the feeding direction.

5. The laser processing apparatus according to claim 4, wherein
   the suction belt, the first feeding roller, and the second feeding roller are configured to
      wind a second surface of the electrode sheet around an outer circumferential surface of the first feeding roller and feed the electrode sheet to the suction belt in the feeding direction, the second surface opposite to the first surface,
      feed the electrode sheet from the suction belt to the second feeding roller, and
      wind the second surface of the electrode sheet around an outer circumferential surface of the second feeding roller.

6. The laser processing apparatus according to claim 5, wherein
- the suction belt is configured to suck a portion of the electrode sheet that is fed from the first feeding roller towards the second feeding roller, and
- the laser irradiation mechanism is configured to apply the laser processing by irradiating the laser beam to the portion of the electrode sheet.

7. The laser processing apparatus according to claim 6, wherein
- the curved shape of the peripheral edge of the opening portion of the dust collection hood includes
  - a first curved shape extending along the outer circumferential surface of the first feeding roller; and
  - a second curved shape extending along the outer circumferential surface of the second feeding roller.

8. The laser processing apparatus according to claim 4, wherein
- the suction belt, the first feeding roller, and the second feeding roller are arranged below the electrode sheet in a vertical direction.

9. The laser processing apparatus according to claim 8, wherein
- the suction belt is configured to suck a portion of the electrode sheet that is fed from the first feeding roller towards the second feeding roller, and
- the laser irradiation mechanism is configured to apply the laser processing by irradiating the laser beam to the portion of the electrode sheet.

10. The laser processing apparatus according to claim 9, wherein
- the curved shape of the peripheral edge of the opening portion of the dust collection hood includes
  - a first curved shape extending along the outer circumferential surface of the first feeding roller; and
  - a second curved shape extending along the outer circumferential surface of the second feeding roller.

* * * * *